March 18, 1969 W. F. JACKSON 3,433,411
UNITARY THERMOSTATIC CONTROL DEVICE WITH DUAL TEMPERATURE SENSORS
Filed June 6, 1966
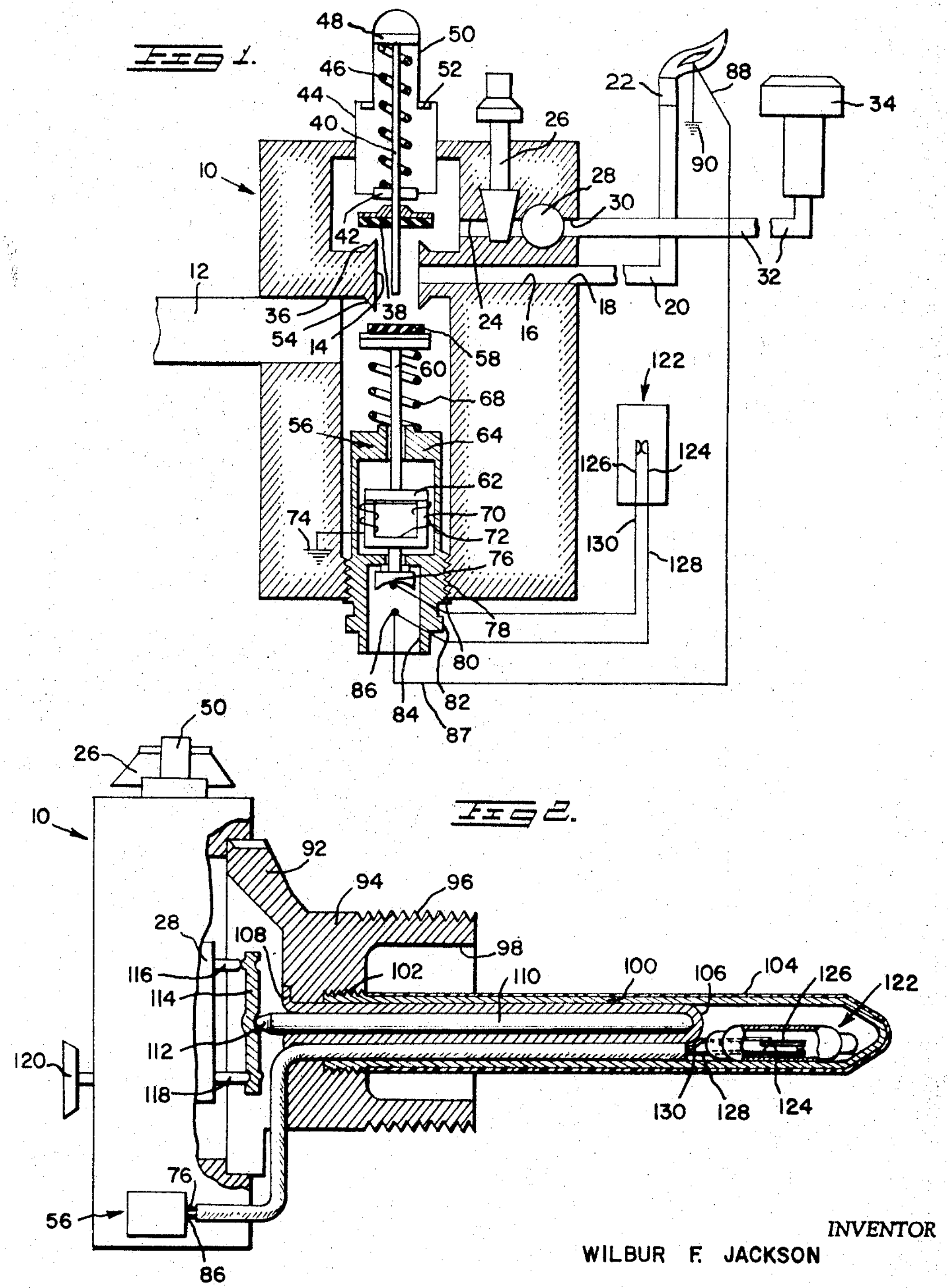
INVENTOR
WILBUR F. JACKSON
BY Anthony A. O'Brien
ATTORNEY United States Patent Office 3,433,411

Patented Mar. 18, 1969

3,433,411

UNITARY THERMOSTATIC CONTROL DEVICE WITH DUAL TEMPERATURE SENSORS

Wilbur F. Jackson, Rolling Hills, Calif., assignor to Robertshaw Controls Company, Richmond, Va., a corporation of Delaware Filed June 6, 1966, Ser. No. 555,311
U.S. Cl. 236—21 6 Claims
Int. Cl. F22b *37/42;* F23n *5/24*

ABSTRACT OF THE DISCLOSURE

A dual thermostat assembly having a normal temperature sensor in the form of a rod and tube thermostat and an abnormal temperature sensor in the form of a bimetal switch; both the normal and abnormal temperature sensor are housed in a sheath of heat conductive material.

The present invention relates to a thermostatic control device and, in particular, to such a control device embodying dual temperature sensors.

In modern heating appliances, such as domestic hot water heaters, it is standard practice to control a supply of fuel to a main burner and to a pilot burner, with the main burner flow being thermostatically controlled within a normal operating range and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube thermostat.

With the above arrangement, failure of the thermostatic valve means for any reason could result in tank explosions from dangerously high temperatures in the hot water tank. Accordingly, it is desirable to provide the control system with a high limit cut off feature responding to abnormal temperature conditions in the water tank. The high limit cut off feature is associated with the thermoelectric safety device, which thus requires reset in response to two separate conditions, one being the extinguishment of the flame at the pilot burner and the other being the occurrence of an abnormal temperature condition.

It is, therefore, an object of this invention to maximize the sensitivity of a pair of temperature sensor means responding to the same medium.

Another object of this invention is to assemble a pair of temperature sensors for a control device in a unitary heat conductive enclosure.

The present invention has another object in that a pair of temperature sensors for a control device are enclosed in the same housing with one sensor being a rod and tube thermostat unit having a tube made of aluminum.

A further object of the present invention is to enclose a pair of temperature sensors for a control device in a sheath of copper material.

A still further object of the present invention is to enclose a pair of temperature sensors for a control device in a sheath of steel material having a corrosion preventing coating.

In accordance with the present invention, a thermostatic control device includes a casing having inlet and outlet means with a flow passage therebetween, control means in the flow passage, thermoelectric means including safety shut-off means in the flow passage and electromagnetic means energized for holding the safety shut-off means in an open position, thermoelectric circuit means for energizing the electromagnetic means, temperature sensor means carried by the casing and being adapted to be disposed in the medium to be temperature controlled, said temperature sensor means including an enclosure of heat conductive material and a rod and tube thermostat unit in said enclosure adapted to move the control means in response to normal temperature conditions, and bimetal switch means in the enclosure being electrically connected in the circuit means for deenergizing the electromagnetic means in response to abnormal temperature conditions.

Other objects and advantages of the present invention will become apparent from the following description of a preferred embodiment, taken in connection with the accompanying drawing wherein:

FIG. 1 is a schematic diagram of a fuel burner control system embodying the present invention; and FIG. 2 is a schematic diagram of the control device of FIG. 1 with parts broken away and parts in section.

While the present invention may be applicable to various types of control devices and various types of heating appliances and may be utilized in connection with electrical heating elements as well as gaseous fuel burning heater elements, it will be described in connection with a fuel burner control system for a hot water heater.

As is illustrated in FIG. 1, the present invention is embodied in a control device including a casing, indicated generally at 10, having an inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 that is controlled by a manually operable on-off valve 26 and a thermostatically operated valve 28, which valves are upstream of a main flow outlet port 30 that communicates with a conduit 32 for supplying fuel to a main burner 34.

The pilot flow passage 16 communicates with the common passage 14 intermediate its opposite ends which define upstream and downstream valve seats. The downstream valve seat 36 is controlled by combined reset and valve means which includes a valve member 38 carried adjacent one end of a reset stem 40. The upper end of the stem 40 extends through a sealing collar 42 on a plunger housing 44 in which a coil spring 46 encircles the stem 40 and is mounted in compression between the collar 42 and a disc 48 on the end of the stem 40. The stem 40 is retained in the housing 44 by means of a hollow push button 50 which receives the stem disc 48 and which includes an annular bottom flange 52 engaging the housing wall surrounding an opening therefor.

The upstream valve seat 54 is controlled by an electromagnetic device, indicated generally at 56, having a safety shut-off valve member 58 movably disposed for cooperation with the valve seat 54. The valve member 58 is fixed to one end of an armature stem 60 which has its other end fixed to an armature 62 located in a fixed magnet housing 64 so that the stem 60 is slidably disposed relative to the housing 64. A coil spring 68 surrounds one end of the armature stem 60 and is mounted in compression between the top end wall of the magnet housing 64 and the rear surface of the valve member 58 which is thus biased to a closed position against the valve seat 54. The valve member 58, stem 60 and armature 62 reciprocate as a unit between released and attracted positions relative to fixed electromagnetic means in the form of a generally U-shaped magnet core 70 and an electric coil 72 wound thereon. One end of electric coil 72 is connected to a ground terminal 74 and the other end is connected to an electrical conductor 76.

As is shown in FIG. 1, the bottom end wall of the magnet housing 64 is defined by support means in the form of a magnet base 78 having external threads so that the entire assembly 56 may be threaded into a suitable opening in the casing 10. In order to prevent any fuel leakage from such opening, the threads are provided with a sealing compound and a tapered sealing lip 80 on the periphery of the magnet base 78 which has a seal tight relationship with the periphery of such opening.

The conductor 76 extends through the top portion of the base 78 and has a concave surface disposed in the upper part of a cavity formed in the bottom portion of the base 78. A hexagonal periphery 82 on the exterior of the base bottom portion receives a wrench or tool for tightening the assembly 56 in the threaded opening of the casing 10. The bottom of base 78 has a threaded opening 84 which receives a thermocouple cable connector (not shown) having a conductor 86; a thermocouple lead 87 from one side of a thermocouple 88 extends to such conductor 86 while the other side of the thermocouple 88 is connected to a ground terminal 90. The thermocouple 88 is mounted in the proximity of the pilot burner 22 so as to be heated from the flame thereof.

As is illustrated in FIG. 2, the thermostatic means for the control device is carried by the casing 10 and a flanged portion 92 of a mounting shank 94 attached to the rear wall of casing 10 as by cap screws (not shown). The free end of mounting shank 94 includes external threads 96 for threading the assembly through the wall of a hot water tank (not shown) and a stepped internal recess 98 that is coextensive with the axis of a sheath 100 of a thermostatic unit; with such an arrangement, substantially the entire length of the sheath 100 is disposed in the hot water resulting in a more accurate and faster response of the thermostatic unit. The inner end of shank recess 98 is threaded to receive the threaded end 102 of the sheath 100 which is made of thermally conductive material, such as drawn copper or steel.

The tubular sheath 100 defines an enclosure for a pair of temperature sensors, so it must be made of a material that will conduct heat. In accordance with one concept of the present invention the tubular sheath 100 is made of copper. In accordance with another concept of the present invention, the tubular sheath 100 is made of steel which is much more economical than copper. As is illustrated in FIG. 2, when the tubular sheath 100 is made of steel, it is provided with a thin coating of any suitable corrosion preventing material, such as plastic 104; of course, those portions of the mounting shank 94, which are exposed to the water in the tank, are also coated, such as the walls of recess 98, the threads 96 and the end wall therebetween. The plastic coating on such mounting shank portions would eliminate the possibility of galvanic circuits when the mounting shank 94 is made of a material different than the tubular sheath 100 and would prevent corrosion of the mounting shank when it is made of steel.

A rod and tube thermostat unit is disposed within the tubular sheath 100 and includes a tube 106 made of aluminum with a peripheral annular flange 108 on its opened end. The flange 108 is a mounting flange that is press fitted or otherwise secured to a recess in the mounting shank 94 whereby the tube 106 is supported in surface contact with adjacent portions of the tubular sheath 100. A rod 110, made of material having a low coefficient of thermal expansion, such as "Invar," is disposed in the tube 106; the closed end of the tube 106 and the adjacent end of the rod 110 are joined for unitary movement thereat, as by brazing, welding or the like. Since, the aluminum tube 106 is in surface contact with a portion of the heat conductive sheath 100 and since the aluminum tube 106 has a greater coefficient of thermal expansion than the copper or steel material, the rate of response and the sensitivity of the rod and tube thermostat unit is greatly increased over conventional rod and tube thermostats.

The free end of rod 110 projects through the opened end of tube 106 and has a rounded end member 112 engaging an intermediate recess in an operating lever 114; a projection on one end of lever 114 engages the actuating rod 116 of the thermostatically operated valve 28 while an indentation on the other end of lever 114 receives the end of an adjusting shaft 118 which is axially movable by means of a temperature setting dial 120. With such an arrangement, it is now apparent that rotation of the dial 120 through a selective range of temperature settings will change the relative position of the operating lever 114 whereby the temperature at which the valve 28 is actuated, will be determined by the adjusted position of the lever 114.

As is illustrated in FIG. 2, the tubular sheath 100 has a greater longitudinal dimension than the rod and tube thermostat unit, which leaves a mounting space in the free end of the tubular sheath 100; a bimetal switch, indicated generally at 122, is disposed in such mounting space. The casing of the switch 122 may be made of any suitable dielectric material, such as ceramic or glass, and includes a fixed contact arm 124 and a movable bimetal contact arm 126 disposed in cooperating relationship therewith. The contact arms 124 and 126 include sealed-in terminals which are connected to lead wires 128 and 130, respectively, that are threaded through the opened end of tubular sheath 100 and are connected to conductors 86 and 76, respectively. Thus, the conductor 86 defines a common junction whereby the bimetal switch 122 is electrically connected in series with the thermocouple lead 87 of the thermoelectric circuit. The switch 122 is calibrated to respond to a predetermined abnormal temperature condition and thus defines a limit switch operable at a higher temperature than that of the normal temperature responsive thermostatic valve 28.

The particular sequence of operation of the above circuitry will be described in detail in connection with the following description of the overall operation of the control device. To place the system of FIG. 1 in operation, the manual valve 26 is rotated to an on position and temperature setting dial 120 for the thermostatically operated valve is moved to a selected temperature, e.g., 140° F. for conventional domestic hot water heaters. The reset button 50 is manually depressed whereby the valve member 38 is closed on valve seat 36 to prevent any fuel flow through the main flow passage 24 during lighting and whereby the lower end of the reset stem 40 moves the valve member 58, stem 60 and armature 62 as a unit against the bias of coil spring 68 to an attracted or valve open position permitting a fuel flow through the pilot flow passage 16 to the pilot burner 22 where it is ignited as by a match. As soon as the thermocouple 88 is heated sufficiently by the pilot burner flame to energize the holding electromagnetic means, core 70 and coil 72, the push button may be released whereupon the armature 62 is held in its attracted position and both valve seats 36 and 54 are open. Inasmuch as the thermostatically operated valve 28 is open, fuel flows to the main burner 34 which is ignited by the flame of the pilot burner 22.

When the water temperature reaches the selected temperature, the valve 28 is closed and the main fuel flow ss cut off and the main burner 34 is extinguished. A subsequent decrease in the water temperature, as when the hot water is drawn off and replenished with cold water, cause the valve 28 to be opened again. During normal operation the main burner 34 will be cycled thermostatically as outlined above to maintain the water temperature at 140° F. The thermostatic operation of the valve 28 is accomplished by the thermostat unit comprising the rod 110 and the tube 106. Upon increasing temperatures, the aluminum tube 106 expands axially and moves to the right as viewed in FIG. 2; the inner "Invar" rod does not expand with temperature increases but is also moved to the right because the connected ends assure that the rod 110 will follow the movement of the tube 106. Similarly, upon decreasing temperatures, the aluminum tube 106 contracts axially and the inner rod 110 is moved to the left as viewed in FIG. 2.

Should the flame at the pilot burner 22 be extinguished from any cause, the thermocouple 88 will cool and the thermoelectric current to the magnet coil 72 will cease; thereupon the armature 62 will be released from the magnet core 70 under the bias of the coil spring 68, which closes the valve member 58 on the valve seat 54 to effect 100% shut off of all fuel flow. In order to place the system in operation again, the resetting procedure outlined above must be repeated.

In accordance with the present invention, the thermostatic device is integrally provided with a separate thermally responsive switch 122 to prevent excessively high water temepratures, e.g., in the range of 190° F. due to some malfunction which keeps the main burner 34 in operation. At 190° F., the high limit switch 122 is opened and the thermoelectric circuit is broken whereby the magnet coil 72 is deenergized and the armature 62 is released to effect 100% shut off of fuel flow as described above. As soon as the temperature decreases to its normal operating range, the bimetal arm 126 closes the high limit switch 122, however, to commence operation of the system, the resetting procedure must be repeated as outlined above.

Inasmuch as the present invention is subject to many other modifications, variations and changes in detail, it is intended that all matter contained in the foregoing description or shown in the accompanying drawing shall be interpreted as illustrative and not in a limiting sense.

What is claimed is:

1. A dual thermostat assembly comprising first temperature responsive means including an inner rod and an outer tube of different thermally responsive materials being concentrically arranged, said tube having a fixed end portion adapted for attachment to a support, said rod and tube having adjacent ends secured together whereby said rod is moved longitudinally in response to thermal expansion and contraction of said tube, said rod having an opposite end adapted to actuate a control element in response to its movement, second temperature responsive means including bimetal switch means adapted to actuate another control element and being disposed externally of but in proximity to said tube so as to respond to temperature conditions of the same medium to which said rod and tube responds, and a tubular enclosure housing both said rod and tube and said bimetal switch means to prevent the same from contact with the medium, said tubular enclosure having an opened end portion adapted to be fixed to the support, said tubular enclosure being made of heat conductive material whereby said rod and tube and said bimetal switch means respond to temperature conditions of the medium.

2. The invention as recited in claim 1 wherein said tube is made of aluminum material.

3. The invention as recited in claim 2 wherein said enclosure comprises a tubular sheath having a closed end portion extending beyond an adjacent end portion of said rod and tube to define a mounting space, and said bimetal switch means is disposed in said mounting space.

4. The invention as recited in claim 3 wherein said tubular sheath is made of copper material.

5. The invention as recited in claim 3 wherein said tubular sheath is made of steel material.

6. The invention as recited in claim 5 wherein said tubular sheath is provided with an external coating of corrosion inhibiting material.

References Cited

UNITED STATES PATENTS

| | | | |
|---|---|---|---|
| 808,689 | 1/1906 | Saugstad | 236—33 |
| 1,678,407 | 7/1924 | Spencer | 236—102 X |
| 1,794,531 | 3/1931 | Newell | 236—102 X |
| 2,312,479 | 3/1943 | Ray. | |
| 3,066,205 | 11/1962 | Epstein | 200—138.6 |
| 3,291,390 | 12/1966 | Solomon. | |
| 3,306,109 | 2/1967 | Caprone. | |
| 3,320,388 | 5/1967 | Kreuter | 200—137 |
| 1,387,853 | 8/1921 | Larson | 236—20 |
| 3,029,026 | 4/1962 | Eskin | 236—32 |

EDWARD J. MICHAEL, *Primary Examiner.*